United States Patent

Bentz et al.

[11] Patent Number: 5,279,211
[45] Date of Patent: Jan. 18, 1994

[54] MECHANICALLY RETAINED WEAR-RESISTANT CERAMIC PAD

[75] Inventors: Joseph C. Bentz; John T. Carroll, III, both of Columbus, Ind.; Katsuhiro Shinosawa, Tokyo, Japan; David P. Genter, Columbus, Ind.

[73] Assignee: Cummins Engine Company, Inc., Columbus, Ind.

[21] Appl. No.: 872,751

[22] Filed: Apr. 24, 1992

[51] Int. Cl.⁵ ............................................. F16J 9/00
[52] U.S. Cl. ............................................. 92/248; 92/255; 92/256; 92/212; 403/361; 403/365
[58] Field of Search ............... 92/248, 129, 212, 215, 92/216, 255, 256; 188/72.4, 264; 403/351, 361, 365, 367; 123/193.6

[56] References Cited

U.S. PATENT DOCUMENTS

| | | | |
|---|---|---|---|
| 541,071 | 6/1895 | Converse | 403/365 X |
| 2,264,480 | 12/1941 | Owen . | |
| 2,363,605 | 11/1944 | McLintock | 92/255 X |
| 2,448,817 | 9/1948 | McArthur . | |
| 2,869,882 | 1/1959 | Zimmerman . | |
| 3,279,835 | 10/1966 | Krohm | 403/361 X |
| 3,452,633 | 7/1969 | Hammon . | |
| 3,820,523 | 6/1974 | Showalter et al. . | |
| 4,325,647 | 4/1982 | Maier et al. . | |
| 4,366,785 | 1/1983 | Goloff et al. . | |
| 4,404,935 | 9/1983 | Kraft . | |
| 4,449,447 | 5/1984 | Yanagi | 92/248 |
| 4,505,119 | 3/1985 | Pundak | 92/256 X |
| 4,508,067 | 4/1985 | Fuhrmann . | |
| 4,572,334 | 2/1986 | Villata | 188/264 G X |
| 4,581,985 | 4/1986 | Villata | 92/248 |
| 4,614,453 | 9/1986 | Tsuno et al. . | |
| 4,643,144 | 2/1987 | Fingerle et al. . | |
| 4,667,627 | 5/1987 | Matsui et al. . | |
| 4,709,621 | 12/1987 | Matsui et al. . | |
| 4,794,894 | 1/1989 | Gill . | |
| 4,806,040 | 2/1989 | Gill et al. . | |
| 4,833,977 | 5/1989 | Hashteia et al. . | |
| 4,848,286 | 7/1989 | Bentz . | |
| 5,031,511 | 7/1991 | Villata | 92/255 X |

FOREIGN PATENT DOCUMENTS 2127928 4/1984 United Kingdom .

OTHER PUBLICATIONS

Standard handbook of fastening and joining. McGraw-Hill, Inc. 1977 Adhesive Bonding—Gerald L. Schneberger—General Motors Institute.

*Primary Examiner*—Thomas E. Denion
*Attorney, Agent, or Firm*—Sixbey, Friedman, Leedom & Ferguson

[57] ABSTRACT

A ceramic-metal composite structure which minimizes tensile ceramic loads and accommodates differences in thermal expansion characteristics between a metal member and a ceramic member without reliance on precise feature control for either member. The composite includes a mechanical retainer which allows a loose fitting relationship between the metal and ceramic members. The ceramic member is secured within a receiving bore in the metal member by the retainer in a manner which eliminates the need for precise machining of the ceramic and metal members. The metal member may be configured to accept either an internal or an external mechanical retainer element. The composite ceramic-metal structure of the present invention finds particular utility in forming a durable wear-resistant interface in internal combustion engine actuator or actuating components, such as compression brake master pistons.

14 Claims, 6 Drawing Sheets

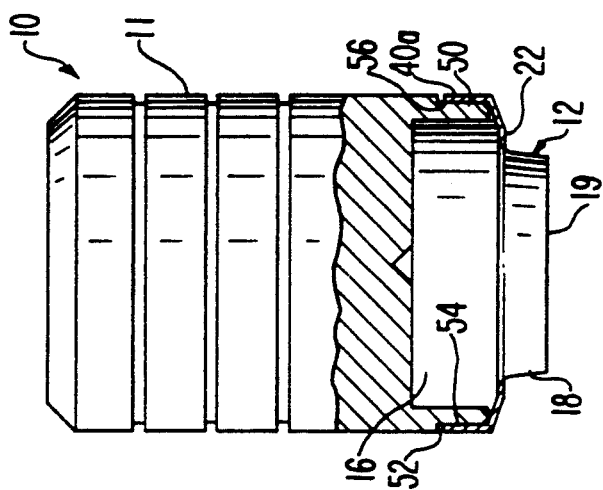
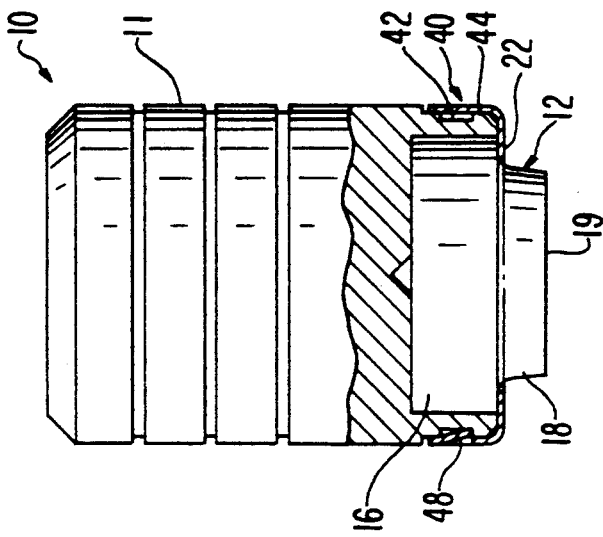
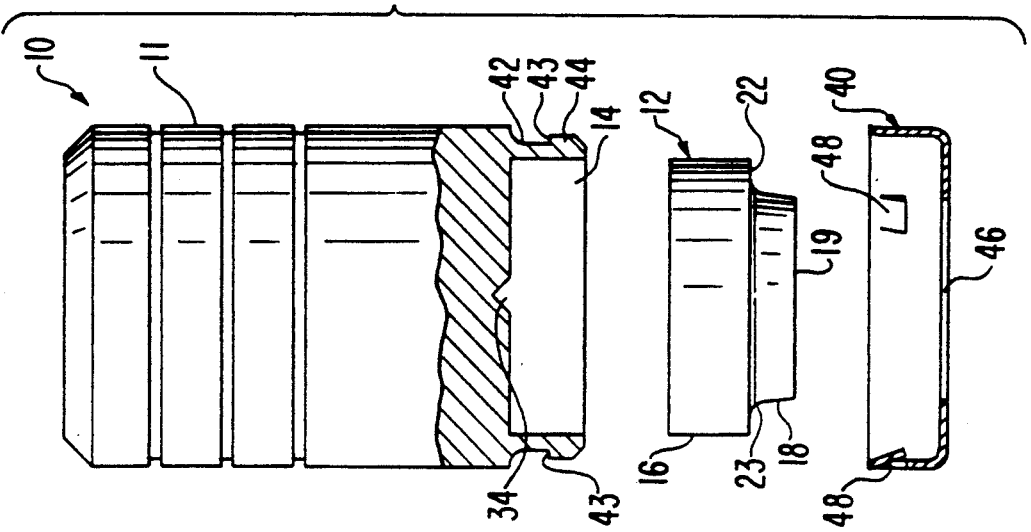

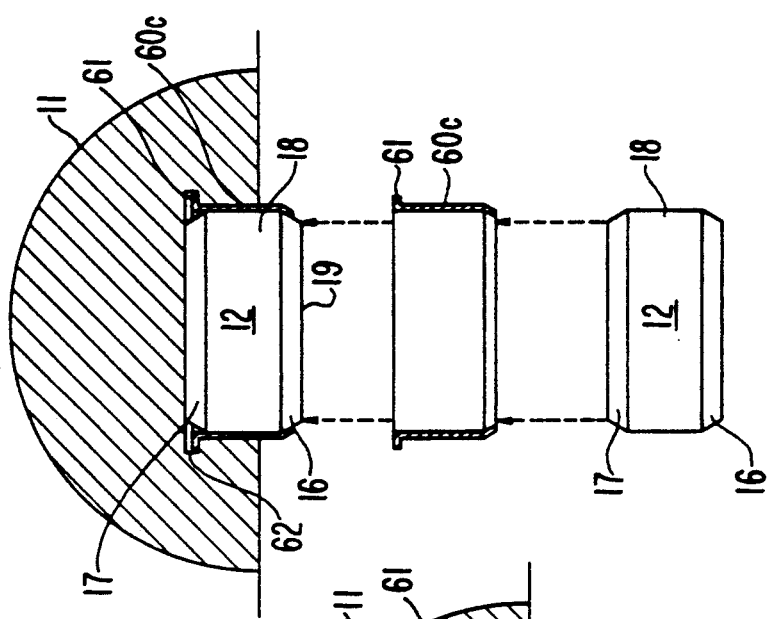
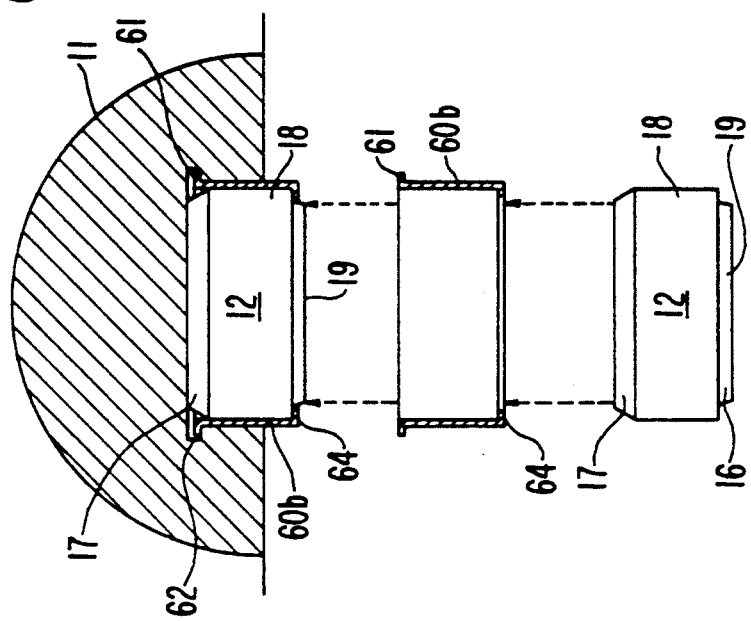
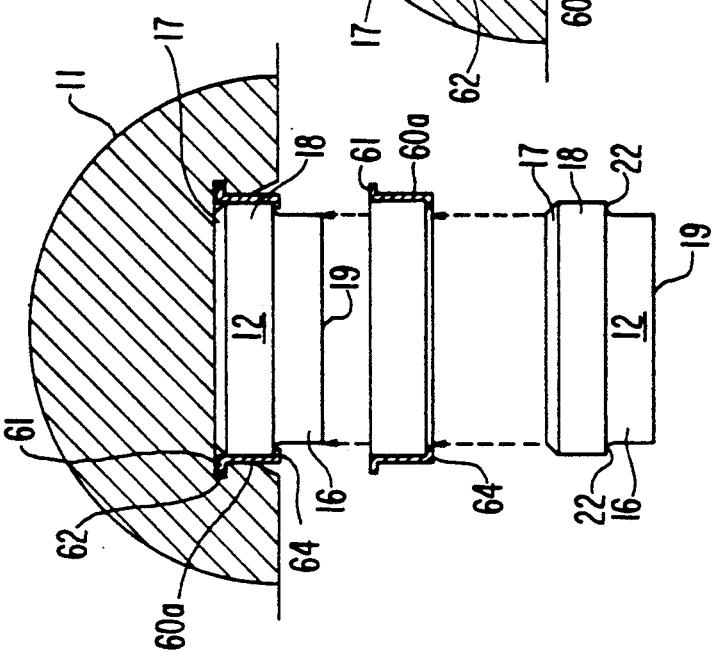

MECHANICALLY RETAINED WEAR-RESISTANT CERAMIC PAD

BACKGROUND OF THE INVENTION

Field of the Invention

This invention relates generally to wear-resistant ceramic-metal composite structures. More particularly, this invention relates to an internal combustion engine component formed from a ceramic element mechanically retained within a metal element.

Description of Related Art

The harsh operating conditions encountered in an internal combustion engine, particularly the high temperatures and high pressures, cause engine components to wear rapidly. Mechanically driven actuators and actuating components are especially susceptible to wear in this environment. Consequently, the materials used for producing actuating engine components should provide good mechanical strength, thermal stability and wear resistance. Metals have typically been used to form such components. However, ceramics, such as zirconia, silicon nitride, silicon carbide and the like, have been found to exhibit excellent mechanical strength, thermal stability and wear resistance. As a result, ceramics are increasingly being used as structural materials for components of gas turbine engines and diesel engines.

Ceramics, despite their promise as wear-resistant engine components, are generally hard and brittle and lack the formability and workability of metals which are conventionally applied to low cost precision engine components. Composites formed from a ceramic element and a metal element have been proposed to overcome these limitations. Although ceramic and metallic composite structures useful as internal combustion engine components are available, a ceramic-metal composite structure sufficiently reliable and durable for use as an actuating component in an internal combustion engine environment has not heretofore been commercialized. The low thermal expansion and tensile strength properties of structural ceramics relative to metals in general make the formation of the secure connection between these two elements required in an actuating component difficult to achieve. It is presently necessary to machine each element to produce tolerances that are not only sufficiently precise to ensure the retention of the ceramic element in the metal element during engine operation, but which also allow for the differential thermal expansion of the ceramic and the metal, and limit tensile stresses in the ceramic.

A number of methods for securing a ceramic element to a metallic element have been developed which attempt to reduce the possibility of bond failure due to differences in the thermal coefficient of expansion between the ceramic and the metal. U.S. Pat. No. 3,820,523, to Showalter et al, U.S. Pat. No. 4,508,067 to Fuhrmann, U.S. Pat. No. 4,643,144 to Fingerle et al, and U.K. Patent Application No. 2 127 928A, for example, all disclose the bonding of a ceramic element to a metal element to form composite structures useful as engine components The composites disclosed in these patents employ an epoxy, an elastomer or some type of adhesive to fix the ceramic element to the metal element.

U.S. Pat. No. 4,643,144 also discloses providing a ceramic insert to be fitted into a metal element with geometrically shaped elevations and depressions on one side to accommodate areas of greater and lesser thickness in an elastomeric bonding layer to compensate for expansion differences in the metal and ceramic. The ceramic-metal composite disclosed in this patent still requires close tolerance machining of both the ceramic insert and the metal component to bond these elements securely together. Such precision machining is time-consuming and can increase significantly the cost of an internal combustion engine component that must be produced in this manner.

It is also known to secure a ceramic component to a metal component by an interference fit between the two components to form a composite structure useful in an internal combustion engine. U.S. Pat. No. 4,366,785 to Goloff et al, for example, discloses a tappet for an internal combustion engine with a ceramic wear resistant insert maintained within the annular metal rim of the main body of the tappet by an interference fit. The wear resistant insert is formed to be slightly larger in diameter than the diameter of the recess into which it is fitted. The ceramic insert is forced into the recess under sufficient pressure to press fit it in the tappet main body. The insert is not required to be sized to fit exactly within the recess in the tappet, but must be slightly larger than the recess. However, to provide a secure interference fit without damaging the metal or ceramic components, each must still be formed to close tolerances.

Additional examples of metal-ceramic composite bodies joined using interference fit methods are disclosed in U.S. Pat. No. 4,614,453 to Tsuno et al, U.S. Pat. No. 4,794,894 to Gill, assigned to Cummins Engine Company, Inc., assignee of the present invention, and U.S. Pat. No. 4,806,040 to Gill et al, also assigned to Cummins Engine Company, Inc.

U.S. Pat. Nos. 4,667,627 and 4,709,621 to Matsui et al disclose engine parts which include ceramic elements or inserts which are attached to metallic elements. Specifically, the ceramic inserts may be attached by shrink-fitting or press fitting. The ceramic may also be joined to the metal with a metallized layer of metal paste formed from a metal powder selected according to the composition of the metal used for the metal component part. Each of these methods still requires that the metal component and the ceramic insert be machined to specific tolerances, however.

Another method of securing a ceramic wear resistant element to a metal element utilizes a separate connecting element or retaining element. U.S. Pat. No. 4,325,647 to Maier et al discloses a connecting element for ceramic and metallic parts formed from an insulating resilient body of a ceramic material. The thermally or mechanically induced differences between the ceramic and metal structures are equalized, and contact stress in the operating state is limited. The insulating body positively connects the ceramic and metallic elements and operates effectively to secure these elements when it has specific physical characteristics, for example, a thermal conductivity of 0.02 to 0.25 W/cmK at a temperature difference between the ceramic and the metallic structural elements of about 100° to 1500° C. and an elastic modulus of about 5000 and 150,000 N/mm$^2$. This composite, however, is not intended to be used in the interface between a mechanically driven actuator or actuating component, but in connection with a piston in the engine cylinder.

External connectors have been proposed for joining a ceramic element to a metal element. For example, U.S.

Pat. No. 4,883,911 to Haahtela discloses a ceramic piston ring carrier held in place on a metal piston by casting in or with a locking ring to improve force transmission and frictional conditions between the piston and the cylinder. U.S. Pat. No. 4,848,286 to Bentz, assigned to Cummins Engine Co., also discloses the use of an external metal connector for joining ceramic and metal components of a pivot rod. Neither of these patents, however, suggests that the arrangement described therein could be used to secure a ceramic element to a metal element to form a wear-resistant interface between engine actuator and actuating components.

Metal and ceramic elements may be connected by integrally shaping each element to produce a secure bond between the ceramic and metal elements. For example, U.S. Pat. No. 4,404,935 to Kraft discloses a ceramic capped piston wherein the ceramic piston cap is fitted into a recess and joined to a metal piston by intermeshing radial flanges biased into engagement with the piston by a spring. Both the ceramic cap, which is intended to provide heat insulation rather than wear resistance, and the metal piston require special machining or casting to provide the necessary intermeshing radial flanges.

The prior art, therefore, has failed to provide a ceramic-metal composite structure in which a ceramic element is reliably and durably retained by a metal element so that the composite can be used to form a wear-resistant interface between actuating and actuator components in a internal combustion engine. The prior art has further failed to provide a ceramic-metal composite that is sufficiently reliable to be useful as a driven actuator or actuating component in an internal combustion engine that can be produced inexpensively in high volume on a large scale so that the production of such components is commercially feasible.

SUMMARY OF THE INVENTION

Therefore, it is a primary object of the present invention to overcome the deficiencies of the prior art and to provide a reliable commercially useful wear-resistant metal and ceramic composite capable of withstanding stresses produced in the interface between a mechanically driven actuator and an actuating component.

It is another object of the present invention to provide a ceramic-metal composite structure wherein a ceramic element is joined securely to a metal element without reliance on close tolerance feature control for either element.

Yet another object of the present invention is to provide a ceramic-metal composite structure geometrically configured to minimize tensile ceramic loads and accommodate the differences in the thermal expansion behavior of the ceramic.

Still another object of the present invention is to provide a durable and reliable ceramic-metal composite structure wherein a ceramic element is mechanically retained within a metal element.

Yet a further object of the present invention is to provide a ceramic-metal composite structure useful for forming a wear-resistant actuating or actuator component of an internal combustion engine wherein a ceramic element is retained in a metal element by a mechanical retainer interior to the composite structure.

A still further object of the present invention is to provide a ceramic-metal composite structure useful for forming a wear-resistant actuating or actuator component of an internal combustion engine wherein a ceramic element is secured to a metal element by a mechanical retainer exterior to the composite structure.

The foregoing objects are achieved by providing a ceramic-metal composite structure which minimizes tensile ceramic loads, accommodates differences in thermal expansion behavior, and which secures these two elements without reliance on precise feature control. The ceramic-metal composite of the present invention produces commercially useful, reliable and durable wear-resistant internal combustion engine actuating or actuator components. The ceramic element is received in a recess in the metal element, where it is held securely by either internal or external mechanical retaining means. The configuration of the ceramic element and the metal element recess are selected according to the type of retaining means used to provide a secure connection between the ceramic element and the metal element without the precision machining required by the prior art. The ceramic-metal composite structure of the present invention is especially capable of withstanding the stresses produced in the interface between a mechanically-driven actuator and an actuating component in an internal combustion engine, such as those encountered in a compression brake master piston.

BRIEF DESCRIPTION OF THE DRAWINGS

FIG. 9 is a partially cut-away, exploded cross-sectional side view of a sixth embodiment of a compression brake master piston designed in accordance with the present invention prior to assembly;

FIG. 10 is partially cut-away, cross-sectional side view of the piston illustrated in FIG. 9 after assembly;

FIG. 11 is a partially cut-away, cross-sectional side view of a seventh embodiment of the present invention;

FIG. 12 is a partially cut-away, exploded cross-sectional side view of an eighth embodiment of the present invention prior to assembly;

FIG. 13 is a partially cut-away, exploded cross-sectional side view of a variation of the FIG. 12 embodiment of the present invention prior to assembly;

FIG. 14 is a partially cut-away, exploded cross-sectional side view of a second variation of the FIG. 12 embodiment of the present invention prior to assembly;

DESCRIPTION OF THE PREFERRED EMBODIMENTS

The present invention is directed to a wear-resistant ceramic and metal composite structure which combines the machinability of metal with the thermal and mechanical wear resistance of ceramic that is especially well-suited for forming driven actuator or actuating internal combustion engine components. Prior combinations of metal and ceramic members for turbine and diesel engine components have required close tolerances between each of the members to prevent any separation of the members and, as a result, have been expensive to produce. These composites have not always been as reliable as might be desired. The present invention overcomes the shortcomings of prior art ceramic-metal composite structures by providing a simple mechanical structure that allows a ceramic element to be reliable and durably retained within a metal element to form a ceramic-metal composite which can be easily and inexpensively formed. Reliable ceramic-metal engine actuating or actuator components can now be readily produced in commercially useful quantities. The mechanical retaining element of the present invention effectively secures a wear-resistant ceramic member within a metal engine component to form a durable, wear-resistant interface between such mechanically actuated engine components as hydraulic tappet sliding cam followers and compression brake master pistons. Moreover, the engine components produced according to the present invention do not require costly precise machining.

Figure 1:
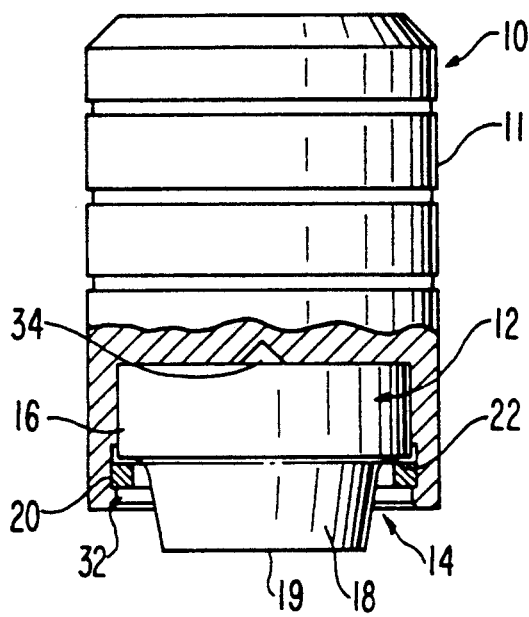
FIG. 1 is a partially cut-away, cross-sectional side view of one embodiment of a compression brake incorporating the ceramic-metal composite structure of the present invention.

Referring to the drawings, FIG. 1 illustrates a compression brake master piston 10. Although this and the remaining Figures discuss the present invention in a compression brake master piston environment, the present invention may also be used to form a wear-resistant metal and ceramic composite which is capable of withstanding stresses produced at any interface between a mechanically driven actuator and an actuating component, such as, for example, a tappet sliding cam follower or a crosshead pad. Piston 10 is made from a metal element 11, which is preferably made of steel, and a ceramic element or pad 12 located within a central receiving recess or bore 14 in the metal element. The present invention contemplates the use of a wide variety of ceramics, such as, for example, zirconia, alumina, zirconium alumina composites, and silicon nitride to form the ceramic element 12. Generally, the ceramic element or pad 12 is shaped such that a first fitted portion 16 of the pad fits within bore 14 and a second contact portion 18 of the pad extends therefrom to provide a wear-resistant interface 19 on the actuating member, piston 10.

A retainer element 20 engages a shoulder or flange 22 located between the first portion 16 and the second portion 18 of pad 12 when it is positioned in place within the piston bore 14. The flange 22 permits pad 12 to rest easily on retainer 20 of first and second portions 16 and 18. A fillet 23 is formed at the transition between the two different diameters to facilitate pad molding and to reduce the stress concentrating effect of the corner that would otherwise be produced where the first and second portions are joined. Retainer 20 is illustrated to have a ring shape in FIGS. 1-2; however, as will become apparent with references to FIGS. 4-8, the retainer element 20 may be constructed to have a variety of ring-type configurations.

Figure 2:
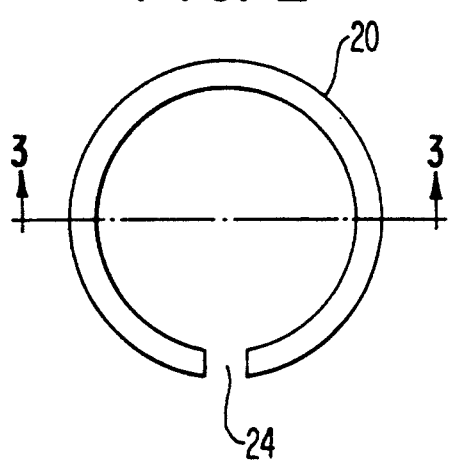
FIG. 2 is a top view of an internal mechanical retaining element of the present invention.

FIG. 2 illustrates one embodiment of retainer element 20 in top view. As illustrated therein, retainer 20 is a ring having a cut or split 24 to allow the ring to press fit into bore 14. The ring may be a square wire as shown composed of a resilient spring steel to ensure that only elastic deformation occurs upon insertion of the ring into bore 14. After insertion, the split ring returns or springs back to its original dimensions to maintain a secure position within the bore. However, the retainer element 20 could have other configurations and could be formed of other materials which will achieve this same purpose.

Figure 3:
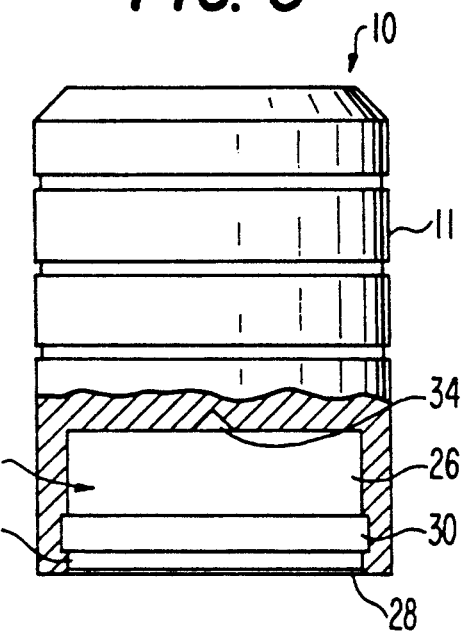
FIG. 3 is a partially cut-away, exploded cross-sectional side view of the master piston of FIG. 1 prior to assembly which includes a cross-sectional view of the retaining element taken along line 3—3 of FIG. 2.

FIG. 3 provides a more detailed view of each of the components prior to assembly. Receiving bore 14 is formed by counter boring the metal element 10 and forming a shallow groove 30 to receive the retainer element 20. Therefore, the receiving bore 14 includes at least three distinct sections, an interior small diameter section 26, and exterior circumferential ridge section 28 and the groove 30, which is a central large diameter section. The diameter of interior section 26 is slightly larger than the diameter of first portion 16 of pad 12. This permits first portion 16 to be maintained within the receiving counterbore 14 while second portion 18, having a sufficiently small diameter, extends through retainer 20 to provide the wear-resistant interface between piston 10 and a mechanically driven actuator (not shown). The central section 30 has a larger diameter than interior section 26 and exterior section 28 to provide a secure engagement location for the retainer element 20. Further, an angular receiving face 32 is provided on the exterior side of exterior section 28 to facilitate the insertion of retainer 20. The angular, sloped design of face 32 encourages the deformation of retainer 20 during insertion. Once it clears exterior section 28, the retainer 20 may return to its original shape and fit snugly within central groove 30. Preferably, counterbore 14 is drilled within piston 10 by a conventional drill or boring tool. The cone-shaped area 34 represents a recess formed by the drill point when the drilling tool comes to rest within the bore 14 to complete the drilling process.

The structure of the ceramic element or pad 12 is also illustrated in FIG. 3 so that the fillet 23 between first portion 16 and second portion 18 can be clearly seen. In addition, the preferred configuration of a section of the pad second portion 18 is shown in FIG. 3. The smaller diameter contact face 19 assists in receiving the retainer element 20.

Figure 4:
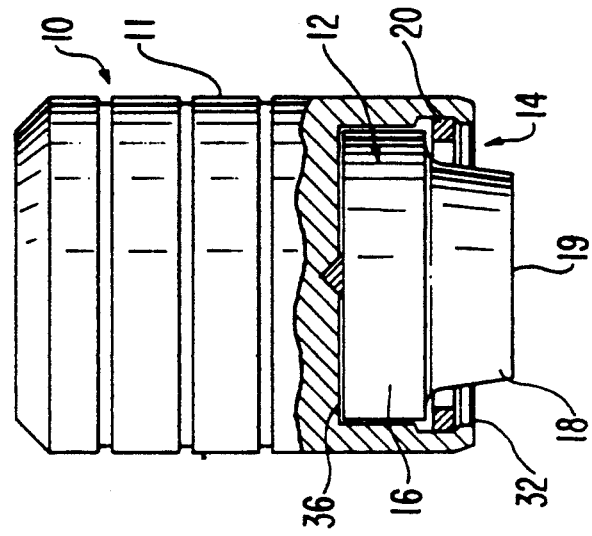
FIG. 4 is a partially cut-away, cross-sectional side view of a second embodiment of the present invention.

FIG. 4 illustrates a second embodiment of the present invention wherein a layer of epoxy resin 36 is inserted between pad 12 and bore 14 to provide a second or back-up means of retention when it is essential to fix the ceramic element within the metal element 11.

Figure 5:
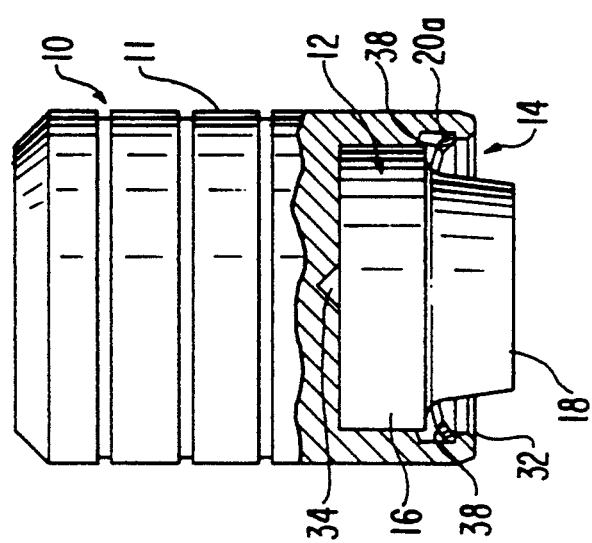
FIG. 5 is a partially cut-away, cross-sectional side view of a third embodiment of the present invention.

FIG. 5 illustrates a third embodiment of the present invention wherein the retainer element is in the form of a disc 20a. The retainer disc 20a is designed to include a plurality of joints 38 having gradually increasing diameters. The outer diameter of disc 20a is sufficiently larger than the inner diameter of central bore section 30, so that when disc 20a is press fit into bore 14, the ends of the disc engage the exterior section 28. The inner diameter of disc 20a is similar to that of the ring 20. The ceramic pad second portion 18 extends therethrough, and the pad 12 rests upon disc 20a at flange 22.

Figure 6:
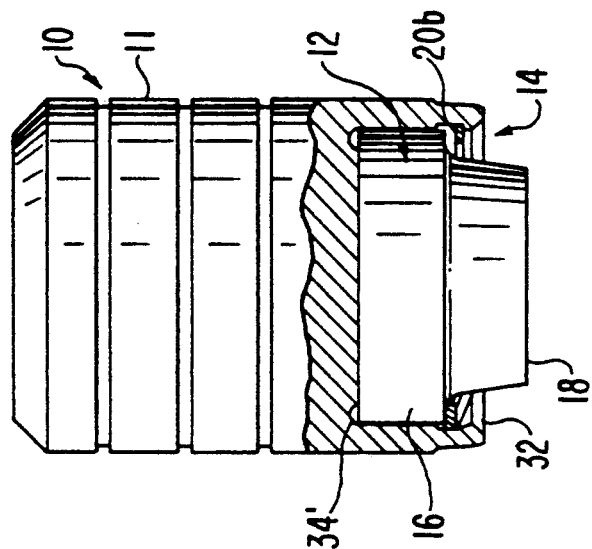
FIG. 6 is a partially cut-away, cross-sectional side view of a fourth embodiment of the present invention.

FIG. 6 illustrates a fourth embodiment of the present invention which includes a helical ring retainer 20b. Helical ring 20b, which has a generally helical configuration, includes a split (not shown). The helical design permits a range of different sizes of ceramic pads 12 to rest snugly against the upper extent of interior section 26, even when there are variations in the depth of bore 14. In addition, FIG. 6 shows an annular drill contact portion 34', demonstrating that different drilling tools can be used to provide the preferred bore configuration.

Figure 7:
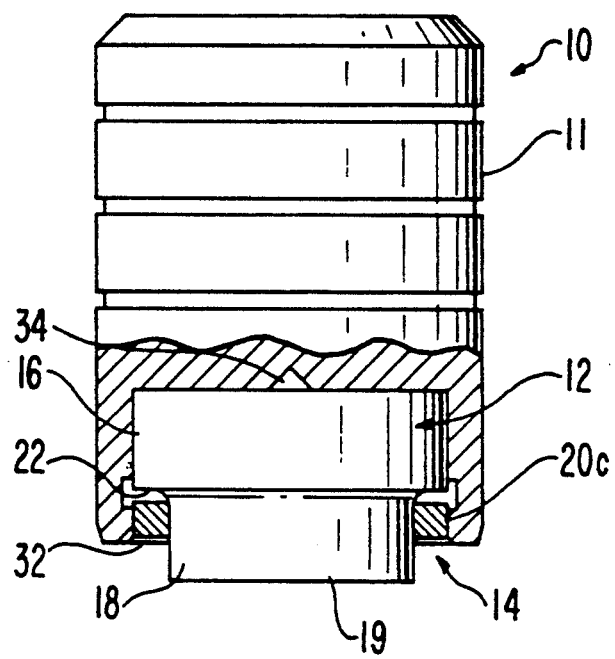
FIG. 7 is a partially cut-away, cross-sectional side view of a fifth embodiment of the present invention prior to assembly.
Figure 8:
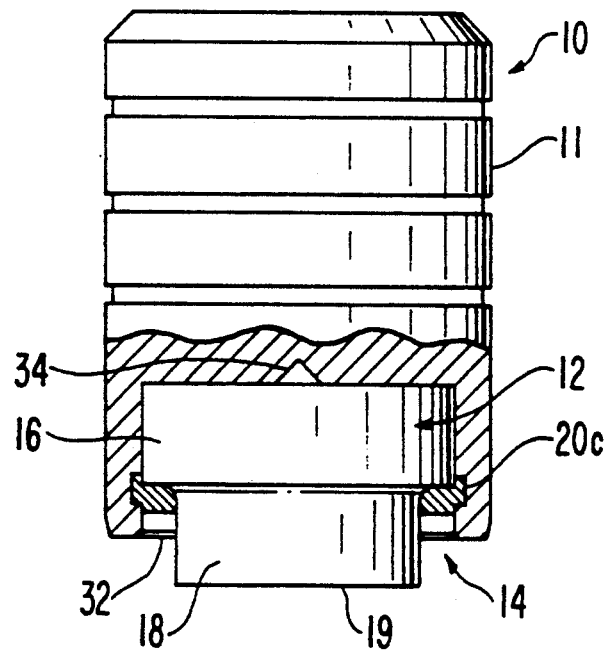
FIG. 8 is a partially cut-away, cross-sectional side view of the fifth embodiment illustrated in FIG. 7 after assembly.

FIG. 7 illustrates a fifth embodiment of the present invention wherein the retainer is a ring 20c formed of a soft metal caulking material. FIG. 7 shows ring 20c after its insertion into bore 14 but prior to the application of sufficient pressure to secure the ceramic and metal elements together. The soft metal ring 20c is pressed into the bore 14 to plastically deform the ring into the central section 30 of the bore. The soft metal is preferably copper or aluminum. In this embodiment, the ceramic pad is fixed within the bore 14. FIG. 8 illustrates piston 10 after ring 20c has been pressed into the bore. Preferably, the height of second portion 18 of pad 12 is such that about half of the second portion is received within the bore 14. FIGS. 7 and 8 further illustrate an additional embodiment of the ceramic pad 12. In this embodiment the second portion 18 of the pad has a constant diameter between the face 19 and the shoulder 22.

FIGS. 9–11 illustrate another type of retainer element according to the present invention, an external cap 40 which engages the exterior of the metal member 11. The ceramic element or pad 12 is shaped as described above to include a first and second portion 16 and 18, respectively, with a fillet 23 therebetween. The second portion may have a constant or an increasing diameter. In this embodiment, however, the receiving bore 14 does not include the shallow groove 30 as discussed above but, rather, is a simple counterbore having approximately the same dimensions as the first portion 16 of pad 12. The metal member 11 is formed to include an external groove 42 and a circumferential ridge 44. The external cap 40 actively engages the exterior of metal member 11 to retain ceramic pad 12 within the bore 14. To accomplish this, the cap 40 includes a central opening 46 which has a diameter slightly larger than the diameter of second portion 18 of pad 12, but smaller than the diameter of first portion 16 to engage shoulder 22 as shown in FIG. 10. The ceramic pad is held securely in place and thus provides a wear-resistant surface 19 for the actuating member or piston 10.

The external retaining cap 40 may include a variety of differently configured projections which assist in securing the ceramic element 12 to the exterior of the metal element 11. For example, in FIGS. 9 and 10 barbs 48 are spaced about the circumference of the cap 40. The barbs 48, which are sized in relation to the height of the circumferential external groove 42 are bent toward the interior of the cap. When the ceramic pad 12 is inserted into the bore 14 and the retainer cap 40 is in place, the barbs 48 will engage a ledge 43 formed between the groove 42 and the circumferential ridge 44 as shown in FIG. 10. Any tendency of the ceramic element 12 to withdraw from the metal element will cause the barbs 48 to engage the ledge 43 more securely.

FIG. 11 illustrates another embodiment of an external retainer element 40a which can be used to hold a ceramic element 12 in a metal element 11. The exterior surface of the metal element is formed to have an end section 50 that has a slightly smaller diameter than the rest of the metal element, thus forming a shoulder 52. A peripheral groove 54 is formed in the end section 50. A corresponding circumferential tongue 56 is formed on the interior surface of the retainer cap 40a so that when the retainer cap 40a is snapped over the end of the metal element 11 to hold the ceramic pad 12 in place, the tongue 56 fits in the groove 54 to assist in holding the cap 40a in place.

FIGS. 12, 13, and 14 illustrate, prior to and after assembly, an additional embodiment and variations of this embodiment of the present invention whereby a ceramic element 12 may be held within a metal element 11 to produce a secure composite with a wear-resistant face 19 in an actuating or actuator component of an internal combustion engine. The retaining elements in each of these embodiments are held substantially internally within bores in the metal elements and are configured to surround that portion of the ceramic element 12 that is actually received within the metal element 11. It will be noted that each of the ceramic elements 12 in FIGS. 12–14 has a slightly different configuration, particularly with respect to the height and diameter of the second portion 18. The height of the first portion 16 may also be varied, depending in part upon the use of the ceramic-metal composite.

FIG. 12, for example, illustrates a ceramic element with first and second portions having approximately equal heights. The diameter of the first portion 16 is larger than the diameter of the second portion 18, and a fillet 23 is formed at the junction of these two portions as in the FIGS. 1–11 embodiments. A narrowly chamfered portion 17 directly contacts the interior of the metal element 11. In FIG. 13, the first portion 16 is substantially greater in height than the second portion 18, and the chamfered portion 17 is somewhat greater in height than the second portion. The FIG. 14 variation shows a large first portion 16 and a chamfered second portion 18 which is substantially equal in size to the chamfered portion 17. In each instance the retaining elements 60a, 60b and 60c include circumferential lips 61 which are received in corresponding recesses 62 in the bores 14 of each of the metal elements shown in FIGS. 12–14. The FIGS. 12 and 13 variations include retainer elements 60a, 60b with circumferential ledges 64 to engage the shoulder 22 of the ceramic elements. The FIG. 14 variation does not have a flange that can be positively engaged by a ledge on the retaining element. Consequently, the retaining element 60c is shaped to correspond to the chamfer on second portion 18 of FIG. 14.

Figure 15:
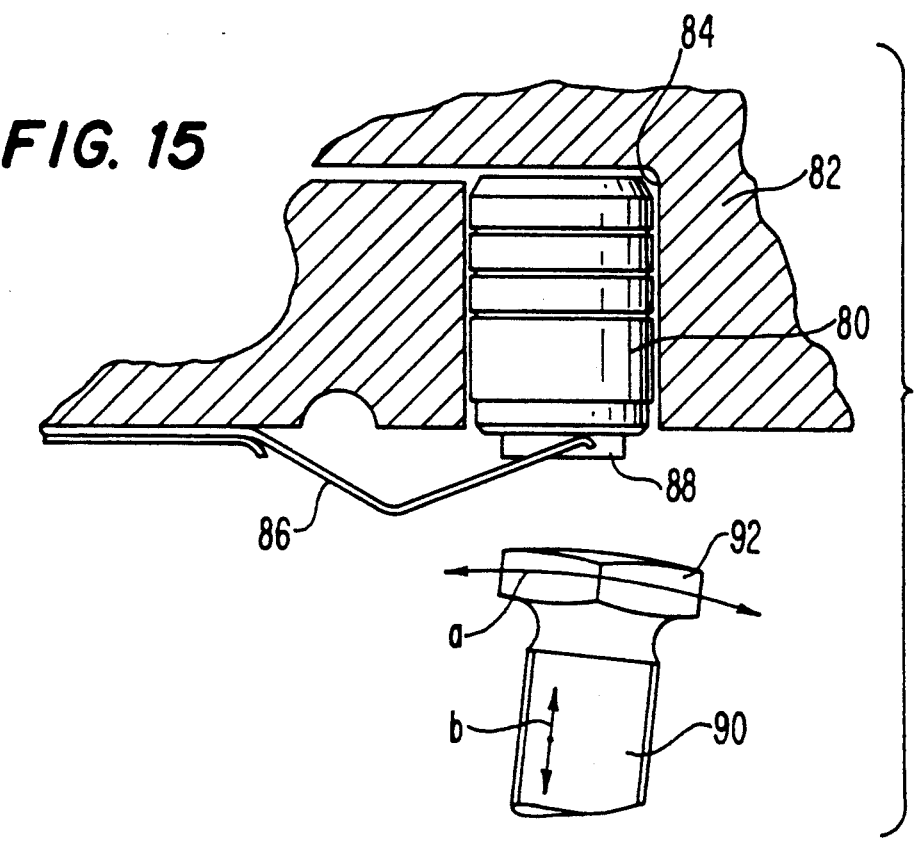
FIG. 15 is a partially cut-away, cross-sectional side view of a compression brake master piston assembly designed in accordance with the present invention.
Figure 16:
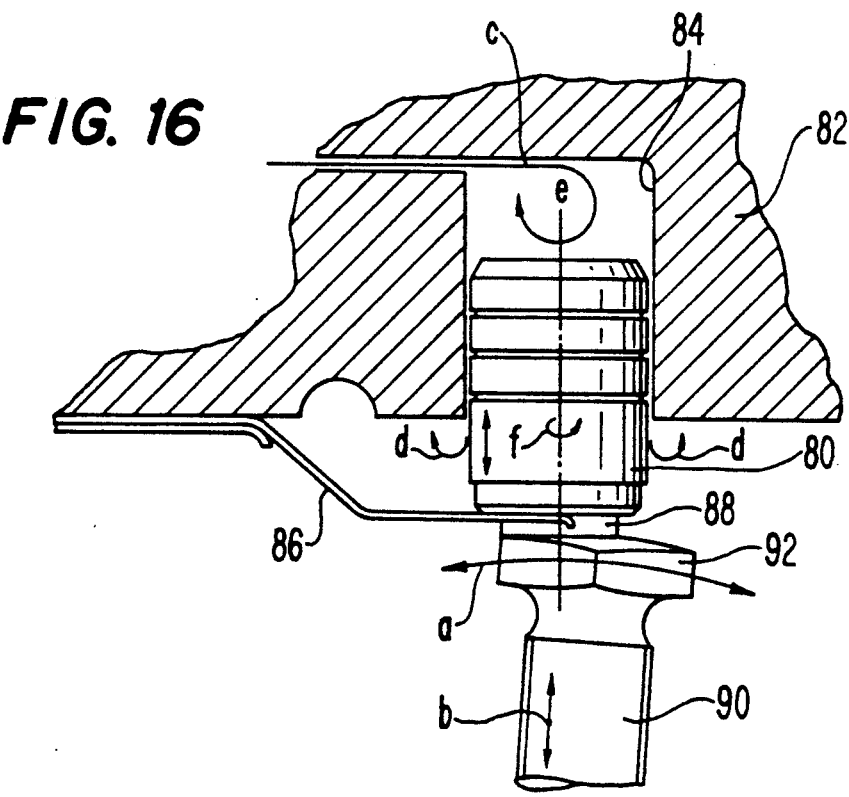
FIG. 16 illustrates the master piston assembly of FIG. 15 in operation.

FIGS. 15 and 16 illustrate one application of the ceramic-metal composite of the present invention to form an actuating component in operation in an internal combustion engine. In this application, the ceramic-metal composite is the master piston 80 in a compression brake. Only a portion of the housing 82 is shown in FIGS. 15 and 16. When the brake is in the "off" position shown in FIG. 15, the master piston 80 is held in a retracted position substantially within the piston bore 84 in the housing 82 by a leaf spring 86. The ceramic element or pad 88 is retained by the master piston 80 according to one of the internal or external retaining element structures discussed above. When the brake is "off" there is no contact between the piston and the rocker lever adjusting screw 90. The adjusting screw 90 is driven by the rocker lever in a combination of cyclic rotating and reciprocating motions as indicated by arrows a and b. Consequently, the hex head 92 of the screw 90 both reciprocates as indicated by arrow b and rocks relative to the piston 80. This causes a sliding while reciprocating interaction between the screw and the piston during compression brake operation.

The master piston 80 and the head 92 of the screw 90 will contact each other when the brake is in the "on" position shown in FIG. 16. In this position the piston is hydraulically extended from the bore 84 by fluid flowing into the bore at arrow c. When the hydraulic pressure on the piston 80 exceeds the leaf spring retaining force, the piston is forced into contact with adjusting screw hex head 92. The piston 80 impacts the adjusting screw 90 once, and the piston is then driven by the screw until the brake is turned off. Continuous contact between the ceramic pad 88 and the screw head 92 is maintained at all times during braking.

The compression brake components are lubricated by splashing oil, the preferred hydraulic fluid, and also by the leakage of high pressure actuation oil, between the piston 80 and the bore 84 in the brake housing as shown by arrows d.

The piston 80 rotates freely about its longitudinal axis e within bore 84 as shown by arrow f. This rotation beneficially distributes wear at the piston—screw interfaces. Piston rotation may also beneficially distribute wear at the interface of the piston 80 and the piston bore 84.

Brake operation time and brake operation cycles depend on many variables, including driving conditions, such as weather and highway topography, vehicle factors, such as power train performance and vehicle weight, and vehicle operator driving habits. For example, some operators use the brake when shifting to higher gears (i.e. up shifting). The brake then remains in the "on" position shown in FIG. 16 to slow the engine between gear changes, which has the potential for producing wear at the interface between pad 88 and head 92. However, momentary brake disengagement occurs automatically with each clutching sequence to prevent braking when the engine is disconnected from the transmission.

The typical axial piston load in the arrangement shown in FIGS. 15 and 16 is about 1650 lbf, with a maximum axial load of about 2500 lbf encountered during transient conditions. Typical and maximum lateral piston loads are about 200 lbf and 300 lbf, respectively. The ceramic-metal composite of the present invention has been found to provide an economical, durable, wear-resistant interface for a compression brake master piston, even under a variety of adverse operating conditions.

INDUSTRIAL APPLICABILITY

The ceramic-metal composite of the present invention will find its primary utility where economical, durable, wear-resistant interfaces between actuator and actuating components of internal combustion engines are desired. While the mechanically retained ceramic-metal composite of the present invention is especially well-suited for forming the master piston in a compression brake, other engine actuating components may also be constructed as described herein.

We claim:

1. A wear-resistant ceramic-metal composite structure capable of withstanding stresses produced at an interface between a mechanically driven actuator and an actuating component in an internal combustion engine, said composite structure comprising:

(a) a ceramic element means having a first fitted portion and a second contact portion wherein said first portion is diametrically larger than said second portion to create a flange therebetween for forming said interface;

(b) a metallic element means including a stepped receiving bore located in an end thereof for receiving said ceramic element means wherein the diameter of a first interior step in said receiving bore is smaller than the diameter of a second step positioned exteriorly of said first step and said first portion of said ceramic element means is fitted within said first step; and (c) retaining element means for retaining said ceramic element means first portion within said receiving bore first interior step in said metallic element means so that said ceramic element means second portion extends exteriorly of said receiving bore second step to form said interface, wherein said retaining means engages said metallic member at said receiving bore second step and said flange of said ceramic element means.

2. The ceramic-metal composite structure of claim 1, wherein said stepped receiving bore of said metallic element means includes an interior small diameter section forming said first step, an exterior circumferential ridge section and a central large diameter groove section forming said second step between the interior small diameter section and the exterior circumferential ridge section, wherein said retaining element means is positioned within said central groove section.

3. The ceramic-metal composite structure of claim 2, wherein said exterior circumferential ridge section includes an inwardly directed angular receiving face to facilitate the insertion of said retaining element means.

4. The ceramic-metal composite structure of claim 3, wherein said retaining element means is a ring which is designed to be press fit into said receiving bore and rest within said central large diameter section.

5. The ceramic-metal composite structure of claim 4, wherein said ring is a planar, circular structure having a larger internal diameter than the diameter of said second portion of said ceramic element means to receive said second portion and engage said shoulder.

6. The ceramic-metal composite structure of claim 4, wherein said ring comprises a soft metal which upon the application of pressure plastically deforms into the circumferentially extending internal groove against said ceramic element means.

7. The ceramic-metal composite structure of claim 6, wherein said soft metal is selected from the group consisting of copper and aluminum.

8. A compression brake master piston of a compression brake assembly comprising:

(a) a metallic member located within a brake housing, said metallic member including at one end thereof a centrally disposed stepped receiving bore with a central circumferentially extending internal groove;

(b) a wear-resistant ceramic member including a fitted portion diametrically larger than a contact portion to create a shoulder therebetween, wherein said fitted portion fits within said metallic member stepped receiving bore and said contact portion contacts an adjusting screw of said compression brake assembly; and (c) a retaining means for retaining said ceramic member fitted portion within said stepped receiving bore of said metallic member where said retaining means engages said metallic member circumferentially extending internal groove and said ceramic member shoulder.

9. The compression brake master piston of claim 8, wherein said receiving bore further includes an inwardly directed angular receiving face to facilitate the insertion of said retaining means.

10. The compression brake master piston of claim 9, wherein said retaining means is a ring which is designed to be press fitted into said receiving bore and rest within said circumferentially extending internal groove.

11. The compression brake master piston of claim 10, wherein said ring is a planar, circular structure having a larger internal diameter than the diameter of said contact portion of said ceramic member to receive said contact portion and engage said shoulder.

12. The compression brake master piston of claim 11, wherein said ring has an external diameter less than the diameter of said circumferentially extending internal groove and includes a split to allow said ring to be press fit into said receiving bore and to resiliently expand within said groove.

13. The compression brake master piston of claim 10, wherein said ring comprises a soft metal which upon the application of pressure plastically deforms into the circumferentially extending internal groove against said ceramic member.

14. The compression brake master piston of claim 13, wherein said soft metal is selected from the group consisting of copper and aluminum.

* * * * *